United States Patent
Abbas

(10) Patent No.: US 11,095,825 B1
(45) Date of Patent: Aug. 17, 2021

(54) CAMERA PAN, TILT, AND ZOOM HISTORY

(71) Applicant: Vitalchat, Inc., San Francisco, CA (US)

(72) Inventor: Ghafran Abbas, Ashburn, VA (US)

(73) Assignee: Vitalchat, Inc., San Francisco, CA (US)

( * ) Notice: Subject to any disclaimer, the term of this patent is extended or adjusted under 35 U.S.C. 154(b) by 0 days.

(21) Appl. No.: 16/890,884

(22) Filed: Jun. 2, 2020

(51) Int. Cl.
*H04N 5/232* (2006.01)

(52) U.S. Cl.
CPC ..... *H04N 5/23299* (2018.08); *H04N 5/23203* (2013.01); *H04N 5/23296* (2013.01)

(58) Field of Classification Search
CPC ........... H04N 5/23299; H04N 5/23203; H04N 5/23296
See application file for complete search history.

(56) References Cited

U.S. PATENT DOCUMENTS

| | | | | |
|---|---|---|---|---|
| 5,959,667 | A * | 9/1999 | Maeng | H04N 7/15 348/211.99 |
| 6,698,021 | B1 | 2/2004 | Amini et al. | |
| 6,766,035 | B1 * | 7/2004 | Gutta | G06K 9/0057 348/E7.079 |
| 6,965,400 | B1 * | 11/2005 | Haba | H04N 5/23227 348/222.1 |
| 8,405,720 | B2 * | 3/2013 | Gupta | G08B 13/1963 348/143 |
| 2003/0202101 | A1 * | 10/2003 | Monroe | G08B 13/19689 348/156 |
| 2004/0100563 | A1 * | 5/2004 | Sablak | H04N 5/23212 348/211.4 |
| 2006/0187306 | A1 * | 8/2006 | Matsui | H04N 7/147 348/207.11 |
| 2007/0291104 | A1 * | 12/2007 | Petersen | H04N 5/232 348/14.01 |
| 2008/0246847 | A1 * | 10/2008 | Suda | H04N 5/23206 348/207.11 |

(Continued)

OTHER PUBLICATIONS

Set Absolute Position Preset for Pelco D With PTZ Controller—Serial Port Tool, https://www.serialporttool.com/sptblog/?p=4787, downloaded Jun. 2, 2020. 5 pages.

(Continued)

*Primary Examiner* — Chiawei Chen
(74) *Attorney, Agent, or Firm* — Young Basile Hanlon & MacFarlane, P.C.

(57) ABSTRACT

A method for controlling a camera that is showing a view of a monitored environment includes receiving, from a user, a user command to change the view of the monitored environment; converting the user command to a camera command, where the camera command includes a change to at least one of a pan setting, a tilt setting, or a zoom setting of the camera; storing, after receiving the user command, a current position of the camera, where the current position includes at least one of a current pan position, a current tilt position, or a current zoom position; controlling, after storing the current position, the camera according to the camera command; receiving, from the user, a back command; and restoring, responsive to the back command, the camera to the current position.

20 Claims, 5 Drawing Sheets

(56) References Cited

U.S. PATENT DOCUMENTS

| | | | |
|---|---|---|---|
| 2010/0157075 A1* | 6/2010 | Yoshizumi | H04N 5/262 348/211.9 |
| 2012/0198386 A1* | 8/2012 | Hautala | H04N 5/23293 715/838 |
| 2015/0297992 A1* | 10/2015 | Ohta | A63F 13/24 463/38 |
| 2016/0054645 A1* | 2/2016 | Contino | H04W 84/12 348/211.99 |
| 2016/0142621 A1* | 5/2016 | Tomren | H04N 5/23203 348/211.8 |
| 2016/0246162 A1* | 8/2016 | Niemeyer | F16M 13/04 |
| 2017/0202628 A1* | 7/2017 | Dell | A61B 34/32 |
| 2019/0099225 A1* | 4/2019 | Todd | H04N 5/44504 |

OTHER PUBLICATIONS

How Do I Set Up and View Preset PTZ Positions on My Professional Recorde?, OpenEye, https://www.openeye.net/faq/how-do-i-set-up-and-view-presets-in-my-professional-series-r, downloaded Jun. 2, 2020, 2 pages.

* cited by examiner

CAMERA PAN, TILT, AND ZOOM HISTORY

CROSS-REFERENCE TO RELATED APPLICATION(S)

N/A.

TECHNICAL FIELD

This disclosure relates generally to camera configuration and more specifically to camera pan, tilt, and/or zoom (PTZ) history.

BACKGROUND

The use for telehealth, telemonitoring, and/or televisits has been increasing and the need for such capabilities has increased especially in response to the COVID-19 pandemic. "Tele" in this context means "from a distance" or "remotely," and more specifically using telecommunication capabilities. Patient rooms may be equipped (in a fixed way or in a movable way) with a telecommunication device (i.e., a monitoring device) that enables telehealth, telemonitoring, and/or televisits. The monitoring device may enable audio and/or visual communication between a remote user (e.g., a physician, a family member, etc.) and an in-room person (e.g., the patient, a nurse, etc.).

SUMMARY

Disclosed herein are implementations of camera pan, tilt, and/or zoom history.

One aspect of the disclosed implementations is a method for controlling a camera to show a view of a monitored environment. The method includes receiving, from a user, a user command to change the view of the monitored environment; converting the user command to a camera command, where the camera command includes a change to at least one of a pan setting, a tilt setting, or a zoom setting of the camera; storing, after receiving the user command, a current position of the camera, where the current position includes at least one of a current pan position, a current tilt position, or a current zoom position; controlling, after storing the current position, the camera according to the camera command; receiving, from the user, a back command; and restoring, responsive to the back command, the camera to the current position.

A second aspect is a device that includes a processor. The processor is configured to receive a camera command to change a view of a monitored environment, where the camera command includes a change to at least one of a pan setting, a tilt setting, or a zoom setting of a camera; store, after receiving the camera command, a current position of the camera, where the current position includes at least one of a current pan position, a current tilt position, or a current zoom position; control, after storing the current position, the camera according to the camera command; receive a back command; and restore, responsive to the back command, the camera to the current position.

A third aspect is a non-transitory computer-readable storage medium that includes executable instructions that, when executed by a processor, facilitate performance of operations. The operations include receiving a camera command to change a view of a monitored environment, where the camera command includes a change to at least one of a pan setting, a tilt setting, or a zoom setting of a camera; storing, after receiving the camera command, a current position of the camera, where the current position includes at least one of a current pan position, a current tilt position, or a current zoom position; controlling, after storing the current position, the camera according to the camera command; receiving a back command; and restoring, responsive to the back command, the camera to the current position.

These and other aspects of the present disclosure are disclosed in the following detailed description of the embodiments, the appended claims, and the accompanying figures.

It will be appreciated that aspects can be implemented in any convenient form. For example, aspects may be implemented by appropriate computer programs which may be carried on appropriate carrier media which may be tangible carrier media (e.g., disks) or intangible carrier media (e.g., communications signals). Aspects may also be implemented using suitable apparatus which may take the form of programmable computers running computer programs arranged to implement the methods and/or techniques disclosed herein. Aspects can be combined such that features described in the context of one aspect may be implemented in another aspect.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

These and other aspects of the present disclosure are disclosed in the following detailed description of the embodiments, the appended claims, and the accompanying figures.

It will be appreciated that aspects can be implemented in any convenient form. For example, aspects may be implemented by appropriate computer programs which may be carried on appropriate carrier media which may be tangible carrier media (e.g., disks) or intangible carrier media (e.g., communications signals). Aspects may also be implemented using a suitable apparatus, which may take the form of programmable computers running computer programs arranged to implement the methods and/or techniques disclosed herein. Aspects can be combined such that features described in the context of one aspect may be implemented in another aspect.

DETAILED DESCRIPTION

A camera may be used to monitor (e.g., view) a monitored environment. A view, as seen by the camera, of the monitored environment can be displayed on a display device (e.g., a screen, etc.) of a user, who may be controlling the camera. The user can change at least one of a pan configuration, tilt configuration, and/or zoom configuration (collectively, a PTZ configuration) of the camera to change the view of the monitored environment that is displayed on the user device. The user can change view of the monitored environment by issuing one or more PTZ commands to the camera. In some applications, it is essential to provide the user with the ability to quickly return the camera a previous PTZ configuration.

For example, in a telehealth application, a physician may be remotely monitoring a patient via a camera that is positioned in the patient's room. The physician may zoom in and out on the patient's face and also pan the camera to a family member of the patient, who is also in the room, to make a comment to, or carry a discussion with, the family member. It would be convenient if the physician could quickly return the camera view to the patient's face again, without having to issue multiple PTZ commands. In another example, the physician may have been called to diagnose a patient emergency. The patient may be currently having a stroke. It would be critical for the physician to be able to quickly zoom in and out of the patient's face to determine whether the patient is indeed having a stroke.

Maintaining a history of current camera PTZ configurations (i.e., a PTZ history) enables the physician to quickly return to a PTZ configuration that is maintained in the PTZ history.

Details of the camera pan, tilt, and zoom history are described herein with initial reference to a system in which the teachings herein can be implemented.

Figure 1:
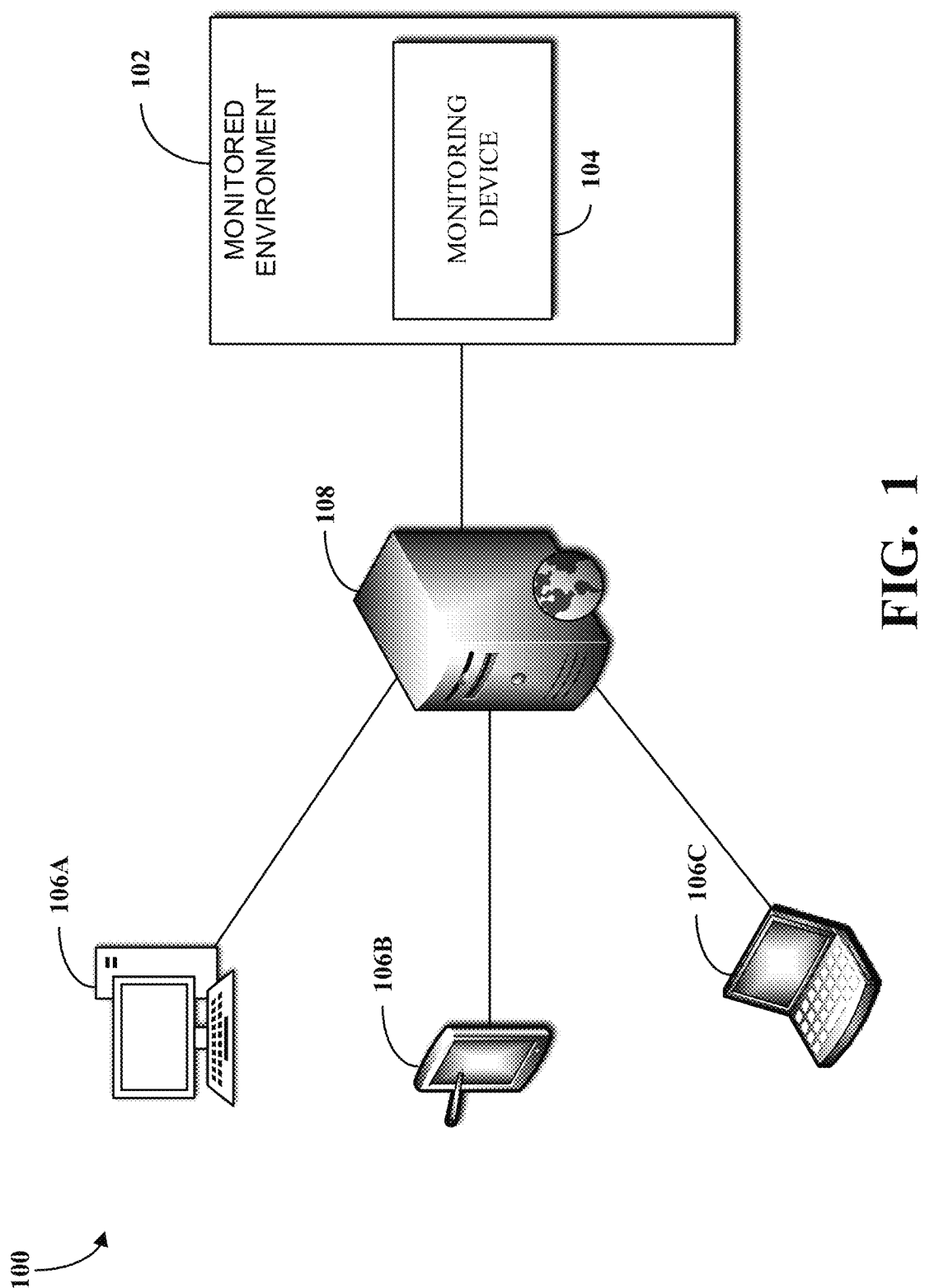
FIG. 1 is an schematic of an example of a system 100 according to implementations of this disclosure.

FIG. 1 is an schematic of an example of a system 100 according to implementations of this disclosure. The system 100 includes a monitored environment 102, a monitoring device 104, a user device 106, and a server 108.

The monitored environment 102 can be a patient hospital room, a nursing home room, a room of a home patient, a manufacturing line, a workstation, a laboratory, and the like. The monitored environment 102 includes and/or can be viewed using the monitoring device 104. The monitored environment 102 can be remotely monitored from the user device 106. The user device 106 can be one or more of a desktop computer 106A, a mobile device 106B (such as tablet, a smart phone, and the like), a laptop computer 106C, or some other device that can be used to access, communicate with, and/or control (directly or indirectly) the monitoring device 104. A user (not shown) of the user device 106 can monitor the monitored environment 102 via the monitoring device 104. That the monitored environment 102 is remotely monitored by the user means that the user may not physically be in the monitored environment 102 while performing the monitoring.

In the case that the monitored environment 102 is a patient hospital room, the user can be a physician, a nurse, another health-care practitioner, a family member of the patient, and/or the like. For example, the physician may be remotely responding to (e.g., diagnosing, mitigating, assessing, etc.) a patient emergency or remotely performing patient rounds. The nurse may be monitoring patients, including the monitored environment 102 from a nurses station to, for example, ensure that no patient is falling, is in need of help, is distressed, and/or the like. The family member of the patient may remotely visit with the patient using the monitoring device 104.

The monitoring device 104 can be configured to and/or used to capture video, images, audio, environmental conditions, or other characteristics of the monitored environment. The characteristics of the monitored environment can be transmitted to one or more users of the user devices 106. Via the user device 106, the user can interact with the monitoring device, such as by sending and/or receiving captured video and/or audio, sending commands to the monitoring device 104, and the like.

The user device 106 and the monitoring device 104 can communicate via the server 108. For example, the user device 106 can send commands to the server 108, which relays the command to the monitoring device. Similarly, the monitoring device 104 can send information to the server 108, which relays the information to the user device 106.

To illustrate, the monitoring device 104 can include a camera that is configured to view the monitored environment 102. The user device 106 can issue a request to the server 108 to establish a connection with the monitoring device 104. The server 108 can establish the connection. Issuing a request to the server 108 to establish a connection can include, for example, the user 106 connecting to a patient by the patient's room number or name; the server 108 determining the monitoring device 104 of the patient (i.e., the monitoring device that is in the patient's room); and the server 108 connecting the user device 106 and the monitoring device 104. The user device 106, may during the connection session, send a pan, tilt, or zoom (PTZ) command to the camera of the monitoring device 104 via the server 108. The monitoring device 104 can update the view of the monitored environment according to the PTZ command and send back, via the server 108, a video and/or image of the updated view of the monitored environment, which can then be displayed on a display of the user device 106. In an example, the server 108 can allow certain users to control monitoring device and not allowing other user devices to control the monitoring device.

In another example (not shown), the user device 106 can establish a peer-to-peer communication channel with the monitoring device 104. For example, in response to the connection request, the server 108 can facilitate the establishment of the peer-to-peer (e.g., direct) communication between the user device 106 and the monitoring device 104.

The server 108 can be deployed (e.g., physically located) on premise at the location of the monitored environment. The server 108 can be deployed on a same local area network (LAN) of the monitoring device 104. The server 108 can be deployed on a same wide area network (WAN) of the monitoring device 104. The server 108 can be a cloud-based server. Other deployments of the server 108 are possible.

The monitoring device 104, the user device 106, and the server 108 can communicate over any suitable network. The network (not shown) can be, for example, the Internet or an Internet Protocol (IP) network, such as the World Wide Web. The network can be a LAN, a WAN, a virtual private network (VPN), cellular telephone network, a private network, an extranet, an intranet, any other means of transferring information (e.g., video streams, audio streams, images, other information), or a combination thereof from one end point to another end point.

In an example, the user device 106 and the monitoring device 104 may communicate using a real-time transport protocol (RTP) for transmission of the media content, which may be encoded, over the network. In another implementation, a transport protocol other than RTP may be used (e.g., a Hypertext Transfer Protocol-based (HTTP-based) streaming protocol). For example, the user device 106 can transmit and/or receive media content (e.g., audio and/or video content) to and/or from the monitoring device 104 via WebRTC, which provides web browsers and mobile applications with real-time communication. However, the disclosure herein is not so limited and any other real-time transmission protocol can be used.

Figure 2:
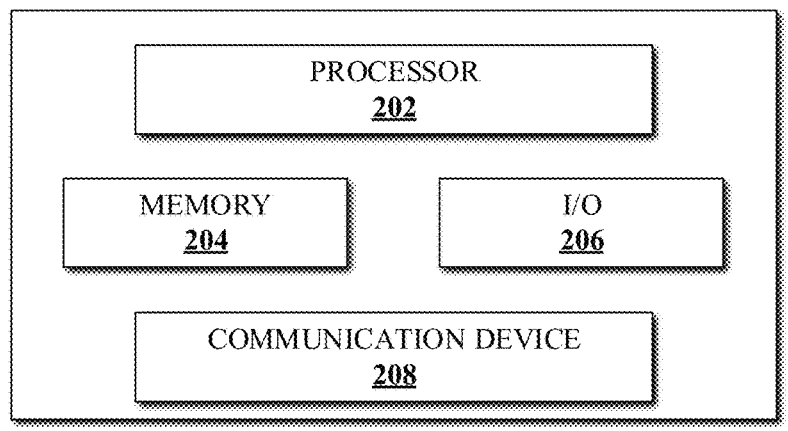
FIG. 2 is a block diagram of an example of a computing device 200.

FIG. 2 is a block diagram of an example of a computing device 200. Each of the monitoring device 104, the user device 106, or the server 108 can be implemented, at least partially, by the computing device 200.

The computing device 200 can be implemented by any configuration of one or more computers, such as a microcomputer, a mainframe computer, a supercomputer, a general-purpose computer, a special-purpose/dedicated computer, an integrated computer, a database computer, a remote server computer, a personal computer, a laptop computer, a tablet computer, a cell phone, a personal data assistant (PDA), a wearable computing device, or a computing service provided by a computing service provider, for example, a web host or a cloud service provider. In some implementations, the computing device can be implemented in the form of multiple groups of computers that are at different geographic locations and can communicate with one another, such as by way of a network. While certain operations can be shared by multiple computers, in some implementations, different computers are assigned to different operations. In some implementations, the system 100 can be implemented using general-purpose computers/processors with a computer program that, when executed, carries out any of the respective methods, algorithms, and/or instructions described herein. In addition, or alternatively, for example, special-purpose computers/processors including specialized hardware can be utilized for carrying out any of the methods, algorithms, or instructions described herein.

The computing device 200 can have an internal configuration of hardware including a processor 202 and a memory 204. The processor 202 can be any type of device or devices capable of manipulating or processing information. In some implementations, the processor 202 can include a central processor (e.g., a central processing unit or CPU). In some implementations, the processor 202 can include a graphics processor (e.g., a graphics processing unit or GPU). Although the examples herein can be practiced with a single processor as shown, advantages in speed and efficiency can be achieved by using more than one processor. For example, the processor 202 can be distributed across multiple machines or devices (each machine or device having one or more processors) that can be coupled directly or connected via a network (e.g., a local area network). The memory 204 can include any transitory or non-transitory device or devices capable of storing executable codes and data that can be accessed by the processor (e.g., via a bus). The memory 204 herein can be a random-access memory (RAM) device, a read-only memory (ROM) device, an optical/magnetic disc, a hard drive, a solid-state drive, a flash drive, a security digital (SD) card, a memory stick, a compact flash (CF) card, or any combination of any suitable type of storage device. In some implementations, the memory 204 can be distributed across multiple machines or devices, such as in the case of a network-based memory or cloud-based memory. The memory 204 can include data (not shown), an operating system (not shown), and an application (not shown). The data can include any data for processing (e.g., an audio stream, a video stream, a multimedia stream, user commands, and/or other data). The application can include programs that permit the processor 202 to implement instructions to generate control signals for performing functions of the techniques in the following description.

In some implementations, in addition to the processor 202 and the memory 204, the computing device 200 can also include a secondary (e.g., external) storage device (not shown). When present, the secondary storage device can provide additional memory when high processing needs exist. The secondary storage device can be a storage device in the form of any suitable non-transitory computer-readable medium, such as a memory card, a hard disk drive, a solid-state drive, a flash drive, or an optical drive. Further, the secondary storage device can be a component of the computing device 200 or can be a shared device accessible via a network. In some implementations, the application in the memory 204 can be stored in whole or in part in the secondary storage device and loaded into the memory 204 as needed for processing.

In addition to the processor 202 and the memory 204, the computing device 200 can include input/output (I/O) devices. For example, the computing device 200 can include an I/O device 206. The I/O device 206 can be implemented in various ways, for example, it can be a display that can be coupled to the computing device 200 and configured to display a rendering of graphics data. The I/O device 206 can be any device capable of transmitting a visual, acoustic, or tactile signal to a user, such as a display, a touch-sensitive device (e.g., a touchscreen), a speaker, an earphone, a light-emitting diode (LED) indicator, or a vibration motor. The I/O device 206 can also be any type of input device either requiring or not requiring user intervention, such as a keyboard, a numerical keypad, a mouse, a trackball, a microphone, a touch-sensitive device (e.g., a touchscreen), a sensor, or a gesture-sensitive input device. If the I/O device 206 is a display, for example, it can be a liquid crystal display (LCD), a cathode-ray tube (CRT), or any other output device capable of providing a visual output to an individual. In some cases, an output device can also function as an input device. For example, the output device can be a touchscreen display configured to receive touch-based input.

The I/O device 206 can alternatively or additionally be formed of a communication device for transmitting signals and/or data. For example, the I/O device 206 can include a wired means for transmitting signals or data from the computing device 200 to another device. For another example, the I/O device 206 can include a wireless transmitter or receiver using a protocol compatible to transmit signals from the computing device 200 to another device or to receive signals from another device to the computing device 200.

In addition to the processor 202 and the memory 204, the computing device 200 can optionally include a communication device 208 to communicate with another device. Optionally, the communication can be via a network. The network can be one or more communications networks of any suitable type in any combination, including, but not limited to, networks using Bluetooth communications, infrared communications, near-field communications (NFCs), wireless networks, wired networks, local area networks (LANs), wide area networks (WANs), virtual private networks (VPNs), cellular data networks, or the Internet. The communication device 208 can be implemented in various ways, such as a transponder/transceiver device, a modem, a router, a gateway, a circuit, a chip, a wired network adapter, a wireless network adapter, a Bluetooth adapter, an infrared adapter, an NFC adapter, a cellular network chip, or any suitable type of device in any combination that is coupled to the computing device 200 to provide functions of communication with the network.

The computing device 200 can also include or be in communication with an image-sensing device (not shown), for example a camera, or any other image-sensing device now existing or hereafter developed that can sense an image such as the image of a user operating the computing device 200 or a view of a monitored environment. The image-sensing device can be positioned such that it is directed to capture a view of the monitored environment. For example, the image-sensing device can be directed toward a patient and/or a patient bed in a hospital room. In an example, the position and optical axis of the image-sensing device can be configured and/or controlled such that the field of vision (i.e., the view) includes an area of interest.

The computing device 200 can also include or be in communication with a sound-sensing device, for example a microphone, or any other sound-sensing device now existing or hereafter developed that can sense sounds near the computing device 200. The sound-sensing device can be positioned or controlled to be positioned such that it is directed toward a monitored environment so as to capture speech, other utterances, or other sounds within the monitored environment. The sound-sensing device can be configured to receive sounds, for example, speech or other utterances made by the user while the user operates the computing device 200. The computing device 200 can also include or be in communication with a sound playing device.

The computing device 200 (and any algorithms, methods, instructions, etc., stored thereon and/or executed thereby) can be realized in hardware including, for example, intellectual property (IP) cores, application-specific integrated circuits (ASICs), programmable logic arrays, optical processors, programmable logic controllers, microcode, firmware, microcontrollers, servers, microprocessors, digital signal processors, or any other suitable circuit. In this disclosure, the term "processor" should be understood as encompassing any the foregoing, either singly or in combination. The terms "signal," "data," and "information" are used interchangeably.

Figure 3:
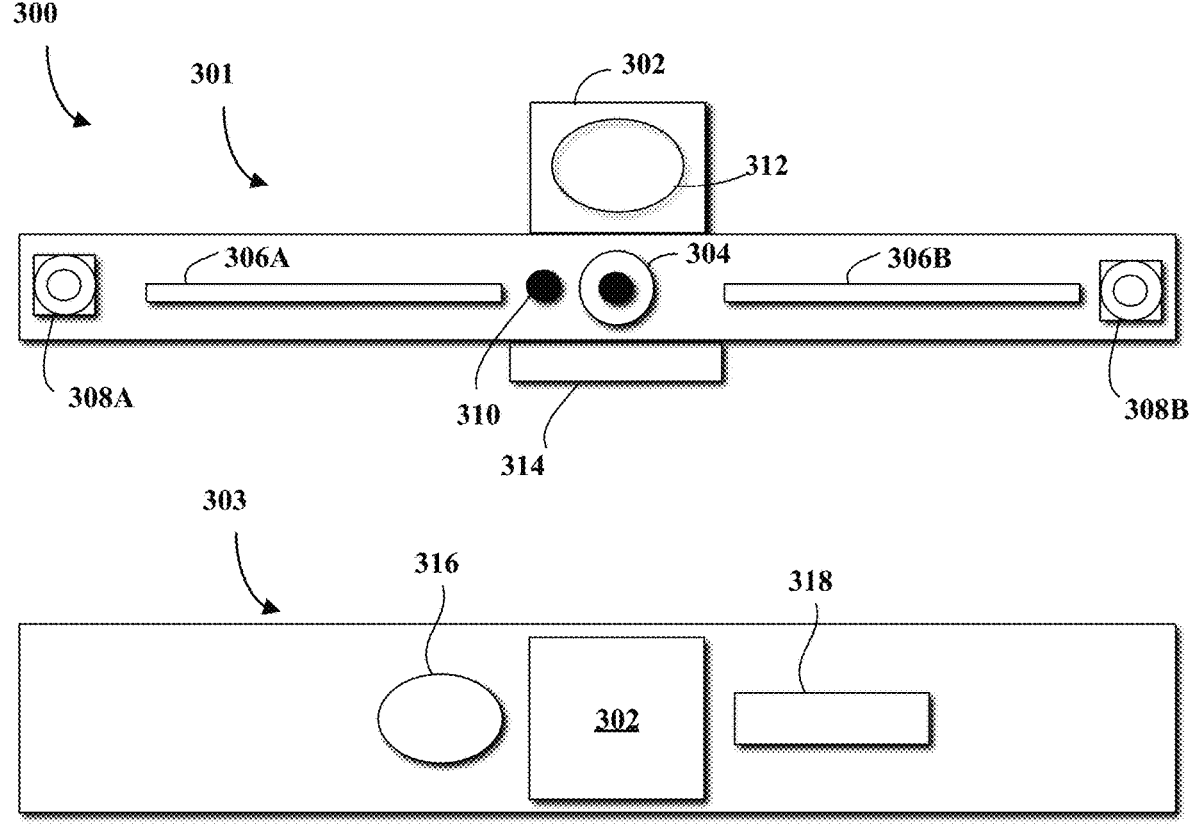
FIG. 3 is a block diagram of an example of a monitoring device according to implementations of this disclosure.

FIG. 3 is a block diagram of an example of a monitoring device 300 according to implementations of this disclosure. The monitoring device 300 can be the monitoring device 104 of FIG. 1. FIG. 3 shows a front view 301 and a top view 303 of the monitoring device 300. The front view 301 faces the monitored environment. The monitoring device 300 includes a camera 302, a fish-eye camera 304, microphone arrays 306A, 206B, infra-red light sensors 308A, 308B, a light sensor 310, a multi-color LED strip 312, a mounting device (i.e., a mount 314), a speaker 316, and a control panel 318. However, a monitoring device according to this disclosure is not so limited and can include fewer, additional, other sensors and/or components, or a combination thereof. While not specifically shown, the monitoring device 300 can also include a processor, as described with respect to the processor 202 of FIG. 2. The monitoring device 300 can also include a memory, such as the memory 204 if FIG. 2.

The camera 302 can be used to view the monitored environment. The camera 302 can include pan, tilt, zoom capabilities so that a remote user, via a user device, such as the user device 106 of FIG. 1, can control the camera 302 to pan, tilt, and/or zoom (PTZ) in order to adjust the view of the monitored environment to a desired view. That is, the monitoring device 300 can receive PTZ commands from the user device. The camera 302 can be capable of a magnification zoom factor of 10×, 12×, 20×, or some other magnification zoom factor. The fish-eye camera 304 can provide a 180° view of the monitored environment.

The microphone arrays 306A, 206B can be used to capture sounds in the monitored environment. The infra-red light sensors 308A, 308B can be used to improve viewing of the monitored environment, such as the monitoring device 104, under low light conditions, such as at night.

The light sensor 310 can be used to sense the ambient light present in the monitored environment. In an example, the amount of detected ambient light can be used to adjust an intensity of a display that may connected to the monitoring device 300. The multi-color LED strip 312 can be used to give a visual indication to an occupant of the monitored environment of an incoming video and/or audio call, that a video and/or audio call is ongoing, or that a video and/or audio call is not active. The multi-color LED strip 312 can be used to provide other visual indicators to the occupant of the monitored environment.

The mount 314 can be used to mount the monitoring device on top of a monitor or a television. In an example, the monitor can be a portable computing device, such as a tablet. In an example, the monitoring device 300 may not itself include a processor. However, via an external connection (shot shown), such as a USB connection, a firewire connection, a Bluetooth connection, or the like, can be connected to a general purpose computer to enable the general purpose computer to perform monitoring functions of the monitored environment. As such, by connecting the monitoring device 300 to any processing unit, the processing unit can be turned into a telehealth end point.

The speaker 316 can be used to output sounds (e.g., voice, speech, etc.), such as those received from a user device, such as the user device 106 of FIG. 1. The control panel 318 can include controls for muting, unmuting, and controlling the volume of the speaker 316. The control panel 318 can also include controls for controlling whether the camera 302 is enabled or disabled. When the camera 302 is disabled, the camera 302 does not visually (via video or images) capture (e.g., view) the monitored environment.

Figure 4:
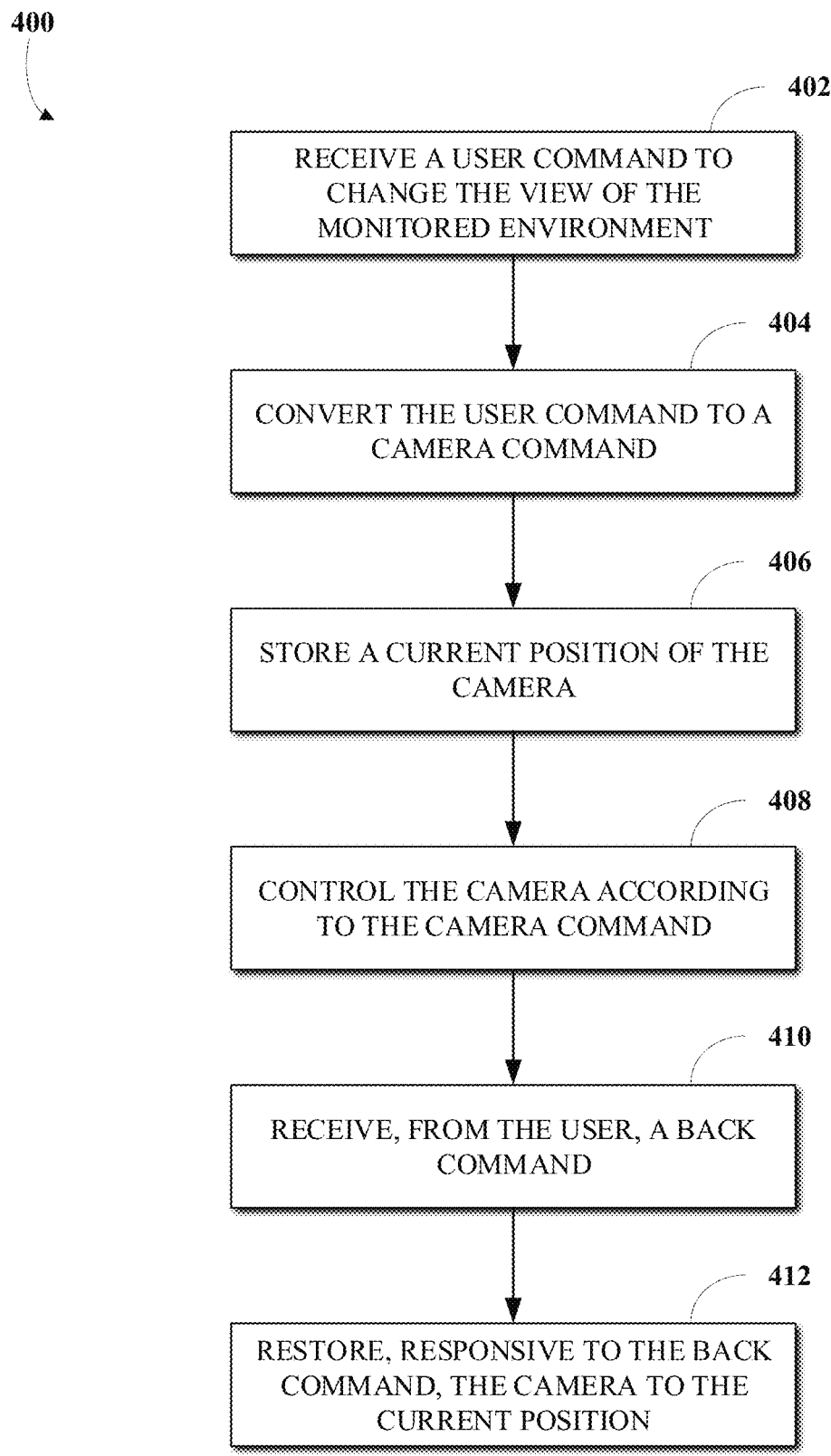
FIG. 4 is an example of a technique for controlling a camera to show a view a monitored environment according to implementations of this disclosure.

FIG. 4 is an example of a technique 400 for controlling a camera to show a view a monitored environment according to implementations of this disclosure. The monitored environment can be the monitored environment 102 of FIG. 1.

The technique 400 can be implemented by a monitoring device, such as the monitoring device 104 of FIG. 1 or the monitoring device 300 of FIG. 3. The technique 400 can be implemented by a computing device, such as the computing device 200 of FIG. 2. The technique 400 can be implemented as computer instructions that may be stored in a memory, such as the memory 204 of FIG. 2. The computer instructions can be executed by a processor, such as the processor 202 of FIG. 2. As mentioned above, the monitoring device may not itself include a processor but may be connected to the processor. Thus, the technique 400 can be implemented by the processor to which the monitoring device is connected.

Figure 5:
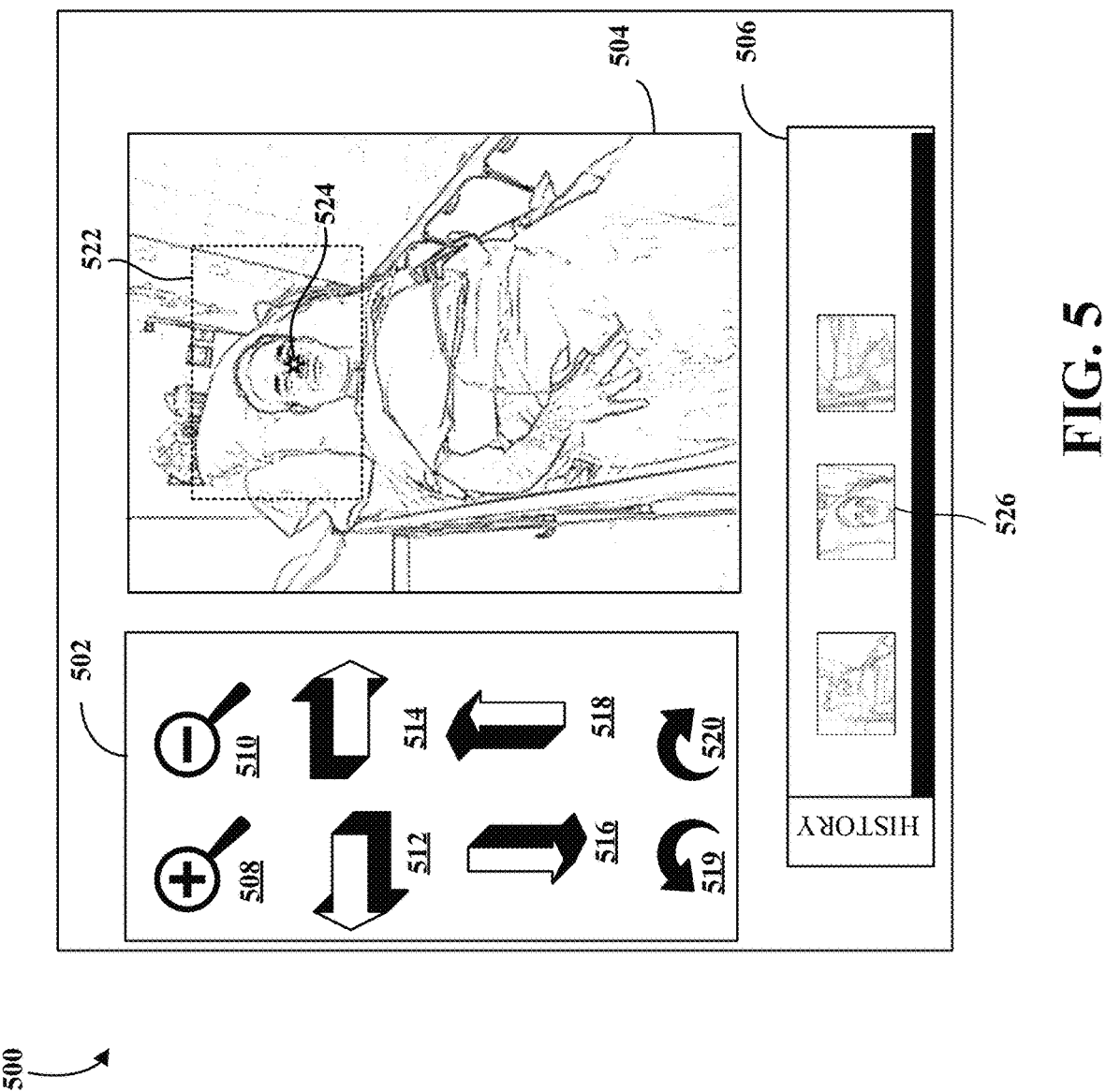
FIG. 5 is an example of a user interface of a user device according to implementations of this disclosure.

For ease of explanation, the technique 400 is described with reference to FIG. 5. FIG. 5 is an example of a user interface 500 of a user device according to implementations of this disclosure. The user device can be the user device 106 of FIG. 1.

The user interface 500 can include a control panel 502 and a view 504. In an example, the user interface can also include a history panel 506. The control panel 502 can include controls that the user of the user device can use to transmit user commands to the monitoring device, and more specifically to a camera of the monitoring device, such as the camera 302 of FIG. 3. Via an input device, the user can select one of the controls of the control panel 502. The user command can be converted by the monitoring device (e.g. the processor) to a camera command.

A user command 508, 510, 512, 514, 516, or 518 allows the user to transmit, respectively, a zoom in, a zoom out, a pan left, a pan right, a tilt down, or a tilt up command to the monitoring device. In response to receiving the user command, the PTZ configuration of the camera is adjusted according to the camera command thereby changing the view of the monitored environment. A back command 519 allows the user to issue a user command to return the PTZ configuration of the camera to a previously stored location, as further described below. A forward command 520 allows the user to issue a user command to return the PTZ configuration of the camera to a more recent stored location. That is, the back command 519 allows the user to return, in reverse chronological order, the camera position to a previously stored PTZ configuration; and the forward command 520 allows the user to return, in chronological order, the camera position to a previously stored PTZ configuration.

The user interface 500 also illustrates a zoom command 522 and a center command 524. The zoom command 522 illustrates that the user of the user device can draw a rectangle, which constitutes the zoom command 522, around an area of interest in the monitored environment. In an example, the zoom command can be converted to screen coordinates (e.g., a top-left corner of the rectangle and width and height of the rectangle). In response to receiving the zoom command 522, the monitoring device adjusts the PTZ configuration of the camera such that the camera is zoomed to the desired location. The monitoring device would then transmit (e.g., stream) to the user device an adjusted view (e.g., the zoomed view) of the monitored environment. The center command 524 illustrates that the user can select a point in the view of the monitored environment. By selecting the center command 524, the view of the monitored environment can be centered at the selected point. In an example, the center command 524 merely causes a pan and/or tilt of the camera so as to center the view at the selected point. In another example, the center command 524 can additionally cause the view to be zoomed to a predetermined zoom factor.

The view 504 displays a static image or a moving image (i.e., a video) the view of monitored environment that is visible using the camera according to the PTZ configuration of the camera.

Returning to FIG. 4. At 402, the technique 400 receives, from the user, a user command to change the view of the monitored environment. More specifically, the user command can be received from the user device of the user. For example, the user command can be one of the user commands 508, 510, 512, 514, 516, or 518.

At 404, the technique converts the user command to a camera command. The camera command includes a change to at least one of a pan setting, a tilt setting, or a zoom setting of the camera. The pan setting, the tilt setting, and/or the zoom setting are collectively referred to herein as a PTZ configuration.

At 406, the technique 400 stores, after receiving the user command, a current position of the camera. The current position of the camera corresponds to a current PTZ configuration of the camera. Thus, the current position includes at least one of a current pan position, a current tilt position, or a current zoom position. Before setting the PTZ configuration of the camera to a new PTZ configuration in response to the user command, and before losing the current PTZ configuration, the current configuration is saved. In an example, the current position can be retrieved from the camera using an application programming interface (API) of the camera. In an example, the current position can be retrieved from a temporary memory location, which is described below with respect to 408.

In an example, the technique 400 stores the current position of the camera in response to receiving an explicit user command to store the current position. For example, the control panel 502 of FIG. 5 can additionally include a "Save" command (not shown). When the user selects the "Save" command, the technique 400 stores the current position of the camera. In another example, the technique 400 stores the current position of the camera in response to the passage of time. For example, the user may issue several user commands in order to get a desired view of the monitored environment. If a predetermined amount of time passes between two user commands, it can be assumed that the current view of the camera reflects a desired view of the monitored environment. The predetermined amount of time can be 1 second, 2 seconds, 3 seconds, or some other predetermined amount of time. In response to not receiving a user command within the predetermined amount of time, the technique 400 can store the current position of the camera. More specifically, the technique 400 can store the current position of the camera in response to a passage of a predetermined amount of time after receiving the user command to change the view of the monitored environment and not receiving another user command to change the view of the monitored environment within the predetermined amount of time.

Figure 6:
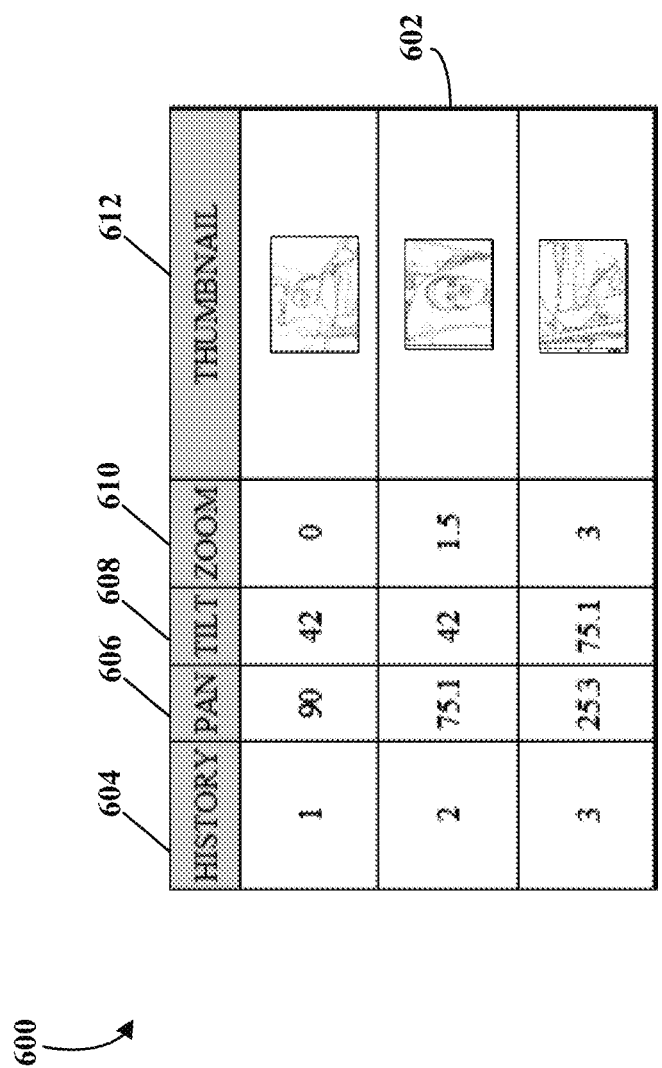
FIG. 6 is an example of a data structure for storing camera PTZ history according to implementations of this disclosure.

In an example the current configuration can be saved to a data structure (i.e., a position history of the camera), which can be as described with respect to FIG. 6.

FIG. 6 is an example of a data structure 600 for storing camera PTZ history according to implementations of this disclosure. The data structure 600 can be stored in a memory, which can be transient or a permanent (e.g., secondary) memory. In an example, the data structure 600 can be stored in the camera, such as the camera 302 of FIG. 3. In an example, the data structure 600 can be stored in a memory of a computing device, such as the memory 204 of FIG. 2. The computing device can be the monitoring device 104 of FIG. 1 or the monitoring device 300 of FIG. 3. The computing device can be the server 108 of FIG. 1. A data structure for storing camera PTZ history is not limited to the data structure 600 as described herein. Any other data structure is possible.

Each entry (e.g., a row 602) within the data structure 600 includes an entry number (e.g., a field 604), which uniquely identifies the entry in the data structure 600. Fields 606-610 store respectively, a pan, a tilt, and a zoom setting of the camera. In some implementations, the data structure 600 can include, in a field 612, an image of the view of the monitored environment at the time that the current position is to be saved. The image of the view can be a full resolution image as captured by the camera. The image of the view can be a scaled down image (e.g., a 100×100, 200×200, or some other scaled-down size) of the image of the view of the monitored environment.

Returning to FIG. 4. At 408, the technique 400 controls, after storing the current position, the camera according to the camera command. In an example, the API of the camera can be used to set the PTZ configuration to a new current PTZ configuration. In an example, in anticipation of receiving another camera command, the new PTZ configuration can be stored to a temporary memory location. In an example, the temporary memory location can be an entry in the data structure 600 of FIG. 6 where such entry is marked as being temporary (not shown). When a new user command is received, the temporary marker can be removed, the camera can be controlled to take an image of the view of the monitored environment, and the image can be stored in the entry. The image can be as described above.

At 410, the technique 400 receives, from the user, a back command. For example, the technique 400 can receive the back command 519 of FIG. 5. At 412, responsive to the back command, the technique 400 restores the camera to the previous position, which is referred to above as the current position. For example, the technique 400 retrieves the last PTZ configuration, which is prior to the latest configuration, from the data structure 600 of FIG. 6. The technique 400 then controls the camera, such as via an API of the camera, to set the camera configuration to the last PTZ configuration.

In an example, the technique 400 can issue a delta command to the camera to change the PTZ configuration of the camera. For example, assume that the current PTZ configuration is (pan=90, tilt=42, and zoom=1.2) and that the last PTZ configuration is (pan=75.1, tilt=47, and zoom=1.2). The last PTZ configuration corresponds to the last PTZ configuration that was stored in the PTZ history. The technique 400 can issue a command to the camera to change the PTZ configuration by (pan=−14.9, tilt=+5, zoom=0).

In an example, and as described with respect to the center command 524 of FIG. 5, receiving, at 402, the user command to change the view of the monitored environment can include receiving, from the user, a location in the monitored environment that is to be set as a center of the monitored environment. In an example, and as described with respect to the zoom command 522 of FIG. 5, receiving, at 402, the user command to change the view of the monitored environment can include receiving, from the user, an indication of an area of the monitored environment that the camera is to zoomed on.

In an example, the technique 400 can include, in response to the user disconnecting from the camera, deleting the current position from the position history. Disconnecting from the camera can be disconnecting from the monitoring device that includes or is in communication with the camera. In an example, the user must first establish a communication session with the monitoring device before being able to control the camera. Thus, when the connection is terminated, any entries in the data structure 600 related to (e.g., saved during, etc.) the communication session are deleted from the data structure 600.

In an example, the user can save specific PTZ configurations from the PTZ history as preferred views. The preferred views can be stored in a server, such as the server 108. When the user establishes a future session with the same patient, the preferred views (e.g., the preferred PTZ configurations) can be retrieved from the server and added to the PTZ history.

In an example, and as described with respect to FIG. 6, the technique 400 can include capturing, after receiving the user command, a current view of the monitored environment; and storing the current view in association with the current position of the camera.

In an example, the technique 400 can include displaying, on a user device of the user, images of previously stored views including the current view. As mentioned with respect to FIG. 5, the user interface 500 can include the history panel 506. The history panel 506 can show, in reverse chronological order from left to right, the images corresponding to the entries of the data structure 600. The history panel 506 can be scrollable list. That is, the history panel 506 can include scrollbar.

In an example, each of the images of the history panel can be selectable (e.g., clickable) by the user. As such, selecting an image of the history panel can be similar to selecting a back command. Thus, in an example, receiving, at 410, the back command can include receiving an indication from the user device of the user that the user selected a stored view; and retrieving, as the current position, a stored position corresponding to the stored view.

For simplicity of explanation, the technique 400 of FIG. 400 is depicted and described as a series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the monitoring device 300, and/or any of the components therein described with respect to FIG. 3 (and the techniques, algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

Further, in one aspect, for example, the monitoring device 300 can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for controlling a camera that is showing a view of a monitored environment, comprising:
   receiving, from a user, a user command to change the view of the monitored environment;
   converting the user command to a camera command, wherein the camera command includes a change to at least one of a pan setting, a tilt setting, or a zoom setting of the camera;
   storing, after receiving the user command, a current position of the camera,
      wherein the current position includes at least one of a current pan position, a current tilt position, or a current zoom position, and
      wherein storing, after receiving the user command, the current position of the camera comprises:
         storing the current position of the camera in response to a passage of a predetermined amount of time after receiving the user command to change the view of the monitored environment and not receiving another user command to change the view of the monitored environment within the predetermined amount of time;
   controlling, after storing the current position, the camera according to the camera command;
   receiving, from the user, a back command; and
   restoring, responsive to the back command, the camera to the current position.

2. The method of claim 1, wherein receiving the user command to change the view of the monitored environment comprises:
   receiving, from the user, a location in the monitored environment that is to be set as a center of the view of the monitored environment.

3. The method of claim 1, wherein receiving the user command to change the view of the monitored environment comprises:
   receiving, from the user, an indication of an area of the monitored environment that the camera is to zoom on.

4. The method of claim 1, wherein the current position is stored in a position history of the camera.

5. The method of claim 4, further comprising:
   in response to the user disconnecting from the camera, deleting the current position from the position history.

6. The method of claim 1, further comprising:
   capturing, after receiving the user command, a current view of the monitored environment; and
   storing the current view in association with the current position of the camera.

7. The method of claim 6, further comprising:
   displaying, on a user device of the user, images of previously stored views including the current view.

8. The method of claim 7, wherein receiving, from the user, the back command comprises:
   receiving an indication from the user device of the user that the user selected a stored view; and
   retrieving, as the current position, a stored position corresponding to the stored view.

9. The method of claim 1, wherein storing, after receiving the user command, the current position of the camera comprises:
   storing the current position of the camera in response to an explicit user command to store the current position.

10. A device, comprising:
    a processor, the processor configured to:
       receive a camera command to change a view of a monitored environment, wherein the camera command includes a change to at least one of a pan setting, a tilt setting, or a zoom setting of a camera;
       store, after receiving the camera command, a current position of the camera, wherein the current position includes at least one of a current pan position, a current tilt position, or a current zoom position;
       control, after storing the current position, the camera according to the camera command;
       receive a back command, wherein to receive the back command comprises to:
          receive a first indication from a user device of a user that the user selected a stored view; and
          retrieve, as the current position, a stored position corresponding to the stored view; and
       restore, responsive to the back command, the camera to the current position.

11. The device of claim 10, wherein to receive the camera command to change the view of the monitored environment comprises to:
    receive a location in the monitored environment that is to be set as a center of the view of the monitored environment.

12. The device of claim 10, wherein to receive the camera command to change the view of the monitored environment comprises to:
    receive a second indication of an area of the monitored environment that the camera is to zoom on.

13. The device of claim 10, wherein the current position is stored in a position history.

14. The device of claim 10, wherein the processor is further configured to:
    capture, after receiving the camera command, a current view of the monitored environment; and
    store the current view in association with the current position of the camera.

15. A non-transitory computer-readable storage medium, comprising executable instructions that, when executed by a processor, facilitate performance of operations, the operations comprising:
    receiving a camera command to change a view of a monitored environment, wherein the camera command includes a change to at least one of a pan setting, a tilt setting, or a zoom setting of a camera;
    storing, after receiving the camera command, a current position of the camera, wherein the current position includes at least one of a current pan position, a current tilt position, or a current zoom position;
    controlling, after storing the current position, the camera according to the camera command;
    receiving a back command, wherein receiving the back command comprises:
       receiving an indication that a stored view is selected; and retrieving, as the current position, a stored position corresponding to the stored view; and restoring, responsive to the back command, the camera to the current position.

16. The non-transitory computer-readable storage medium of claim 15, wherein receiving the camera command to change the view of the monitored environment comprises:

receiving a location in the monitored environment that is to be set as a center of the view of the monitored environment.

17. The non-transitory computer-readable storage medium of claim 15, wherein receiving the camera command to change the view of the monitored environment comprises:

receiving an indication of an area of the monitored environment that the camera is to zoomed on.

18. The non-transitory computer-readable storage medium of claim 15, wherein the current position is stored in a position history.

19. The non-transitory computer-readable storage medium of claim 15, wherein the operations further comprise:

capturing, after receiving the camera command, a current view of the monitored environment; and storing the current view in association with the current position of the camera.

20. The non-transitory computer-readable storage medium of claim 15, wherein the operations further comprise:

storing the current position of the camera in response to a passage of a predetermined amount of time after receiving a user command to change the view of the monitored environment and not receiving another user command to change the view of the monitored environment within the predetermined amount of time.

* * * * *